3,406,114
PROCESS FOR FLOCCULATING FINELY DIVIDED
SOLIDS SUSPENDED IN AN AQUEOUS MEDIUM
WITH A MICROBIAL POLYSACCHARIDE
Mayer B. Goren, Golden, Colo., assignor to Kerr-McGee
Oil Industries, Inc., a corporation of Delaware
No Drawing. Filed July 20, 1964, Ser. No. 383,949
15 Claims. (Cl. 210—54)

ABSTRACT OF THE DISCLOSURE

Finely divided inorganic solids suspended in an aqueous medium are flocculated and settled by mixing therewith a flocculating agent including a microbial polysaccharide prepared by cultivating a microorganism such as *Pullularia pullulans, Xanthomonas campestris* B-1459, *Arthrobacter* sp. B-1973, *Cryptococcus laurentii* var. *flavescens* Y-1401, *Hansenula capsulata* Y-1842, *Hansenula holstii* Y-2154, *Hansenula holstii* Y-2448 and *Plectania occidentalis* NRRL-349 in an aqueous fermentation medium therefor.

---

This invention broadly relates to a novel process for flocculating finely divided solids suspended in an aqueous medium. In one of its more specific aspects, the invention relates to the use of certain microbial polysaccharides as flocculating agents.

Flocculating agents find use in a large number of applications in industry, such as in the flocculation of suspended slimes from aqueous solutions resulting from the benefication by hydrometallurgical processes of uranium, potash, aluminum and other ores. A large number of natural and synthetic materials are used at present for this purpose. Examples of natural materials include agar, guar gum, glue, gelatin, starch, and modified cellulose derivatives, while examples of synthetic materials include polyacrylamides, polymethacrylic acid and polyvinyl pyrrolidone.

Still other materials may be prepared or synthesized by microorganisms such as the dextran described in United States Patent No. 3,085,853 to Lesinski et al. for use in processing bauxite ore. However, the dextran described in the Lesinski et al. patent has a very low flocculating activity and it is usually considered to be unsatisfactory for use as a general flocculating agent in treating slime-containing hydrometallurgical leach liquors on a commercial scale.

It has been discovered that certain microbial polysaccharides are excellent flocculating agents for finely divided solids such as slimes suspended in aqueous media. The present invention provides for the first time an efficient and vastly improved flocculating process employing microbial polysaccharides which is especially useful for the flocculation of slimes present in hydrometallurgical leach liquors, and which also may be utilized effectively and at low cost in a wide variety of other commercial flocculating processes.

It is an object of the present invention to provide a novel process for flocculating finely divided solids suspended in aqueous media with microbial polysaccharides.

It is a further object to provide a novel process for flocculating inorganic slimes suspended in aqueous hydrometallurgical liquors with microbial polysaccharides.

It is still a further object to provide a novel process for flocculating slimes suspended in aqueous leach liquors derived by leaching Carlsbad type potash ore which employs microbial polysaccharides as a flocculating agent.

Still other objects and advantages of the invention will be apparent to those skilled in the art upon reference to the following detailed description and the examples.

The microbial polysaccharide flocculants for use in the process of the invention may be synthesized by cultivating microorganisms selected from Table I in an aqueous fermentation medium.

TABLE I

Algae:
   *Chlorella vulgaris*
   *Chlorella pyrenoidosa*
   *Chlorococcum* sp.
Bacteria:
   *Acetobacter levanicum*
   *Alcaligenes faecalis* ATC 212
   *Arthrobacter* sp. B-1973
   *Arthrobacter globiforme*[1] NRCC
   *Azotobacter indicum*[1] (*Beijerinckia indicum*)
   *Azotobacter vinelandii*
   *Bacillus ethanicus*
   *Bacillus megatherium*
   *Bacillus mesentericus*
   *Bacillus subtilis* NRCC 2035
   *Bacterium aliphaticum liquefaciens*
   *Bacterium hedium*
   *Bacterium oligocarbophilus*
   *Beggeotoa alba*
   *Chromobacterium violaceum*
   *Corynebacterium fascians*
   *Corynebacterium flaccumfaciens*[1]
   *Corynebacterium insidiosum* 110 Starr
   *Corynebacterium laevaniformans*
   *Corynebacterium michiganense*
   *Corynebacterium rathayii*
   *Corynebacterium sepedonicum*
   *Corynebacterium tritii*
   *Klebsiella aerogenes*
   *Methanomonas methanica*
   *Pseudomonas methanica*[1]
   *Rhizobium leguminosarum*
   *Sphaerotilus natans*
   *Streptomyces* sp.
   *Thiothrix nivea*
   *Xanthomonas campestris*[1] NRRL B-1459
   *Xanthomonas carotae* NRCC 10547
   *Xanthomonas hederae*
   *Xanthomonas hyacinthii* NRCC 12612
   *Xanthomonas maculofoliigardeniae* NRCC 10201
   *Xanthomonas malvacearum* NRCC 12131
   *Xanthomonas oryzae*
   *Xanthomonas papavericola*
   *Xanthomonas phaseoli* NRCC 11766
   *Xanthomonas pruni*
   *Xanthomonas stewartii*
   *Xanthomonas translucens* NRCC 10772
   *Xanthomonas vesicatoria*
   *Xanthomonas vignicola* NRCC 11648
   *Zoogloea ramigera*
Fungi:
   *Aspergillus fischerii*
   *Aspergillus niger*
   *Aspergillus parasitious* QM 884
   *Aspergillus sulphureous*
   *Aspergillus sydowi*
   *Candida heveanensis* Y-1510
   *Claveria cinerea*
   *Coccidioides immitis*
   *Coprinus atramentericus*
   *Cryptococcus albidus* Y-1516, Y-1400
   *Cryptococcus diffluens*[1] NRRL Y-1505, Y-1517
   *Cryptococcus flavescens* Y-1401
   *Cryptococcus laurentii* var. *flavescens*
   *Cryptococcus luteolus* Y-986
   *Cylindrocorpon radiciola*
   *Dacrymyces palmatus*
   *Dictyostelium discoideum*

[1] See footnote at end of table.

TABLE I—Continued

*Fumago vagans*
*Fusarium aquiductum* (low pH)
*Fusarium lini*
*Fusarium moniliforme* (*Gibberella fujikuroi*) NRRL B–1951
*Fusarium solani* [1]
*Hansenula capsulata* Y–1842
*Hansenula holstii* Y–2448
*Hansenula holstii* Y–2154
*Leptomitus lacteus*
*Lipomyces lipofera* Y–1351
*Mucor racemosus* [1]
*Penicillium brevi-compactum*
*Penicillium capreolinum* Y–1510
*Penicillium charlesii*
*Penicillium digitatum*
*Penicillium expansum* [1]
*Penicillium javanicum*
*Penicillium luteum*
*Penicillium nigricans*
*Penicillium rugulosum*
*Penicillium schlerotiorium*
*Penicillium varians*
*Penicillium vinaceum*
*Pestalotia ramulosa*
*Phymototrichum omnivorum*
*Plectania occidentalis* [1] NRRL 349
*Pullularia pullulans* [1] (*Aureobasidium pullulans*)
*Rhodotorula mucilaginosa* [1]
*Schizophyllum commune* [1]
*Selenaspora sp.*
*Stysanus stemonites*
*Tremella braziliensis* [1]
*Tremella encephala*
*Tremella foliaceae*
*Tremella mesenterica* [1]
*Tremella subanomala*
*Tricholoma personatum*
*Trichoderma viride* [1]
*Taphrina sp.* NRRL YB 3638
*Torulopsis rotundata* NRRL Y–1510
Protozoa: *Carchesium sp.*

---

[1] Microbes which are especially useful in practicing the invention.

The microbes listed in Table I may be cultivated by known fermentive procedures to produce polysaccharide flocculants which are useful in practicing the present invention. It is understood that one or more of the above microbes may be cultivated in the aqueous fermentation medium.

The aqueous fermentation medium may contain the usual substances which are known to be necessary for the growth and cultivation of the selected microbes to synthesize the polysaccharide flocculant. Certain microbes may require known specific ingredients, while others will grow on a variety of substrates. The source of carbon for growth may be any suitable carbon-containing material readily assimilatable by the microorganism and in many instances may include normally gaseous hydrocarbons such as methane, ethane, propane and higher paraffinic hydrocarbons, or a carbohydrate such as about 0.02–15% by weight of the fermentation medium of dextrose, sucrose, maltose, fructose, black strap molasses, cane syrup or sugar, beet sugar, wood sugar or sugars derived by hydrolysis of wood or wood products, starch or starch products. Small amounts of carbon dioxide or carbon monoxide should be present if autotrophic microbes are grown, and light sufficiently intense to support optional growth should be supplied in instances where photosynthetic autotropes are grown. The nitrogen requirement is usually about 0.01–1.0% by weight of the fermentation broth, and may be supplied by one or more nitrogen-containing substances readily assimilable by the microorganism such as water soluble metal nitrates, urea, ammonium salts, amino acids, proteins or atmospheric nitrogen. From about 0.05 to 0.40% by weight of monobasic and dibasic water soluble metal phosphates may be added to buffer the system at the desired pH and to supply required phosphate. Also, about 0.01–0.40% by weight of a water soluble metal sulfate may be added. Preferably manganese sulfate is added as it supplies an important divalent cation which is often desirable for adequate rates of growth. A second divalent metal ion may be added in an amount of about 0.01–0.40% by weight in the form of a water soluble magnesium salt such as the chloride.

Still other nutrients may be present in the fermentation medium. For instance, certain specific microbial systems grow much more rapidly in the presence of about 0.001–0.05% by weight of yeast extract, beef extract, casein hydrolysate or peptones, and one or more of these substances may be added to supplement the fermentation medium. This is especially useful when small amounts of vitamins or amino acids are required for rapid growth.

One specfic fermentation medium which is very effective in the cultivation of certain microorganisms such as *Pullularia pullulans* or other black yeast may contain 100 milliliters of water, 0.05–15 grams of a carbohydrate utilized by the microorganism such as sucrose, 0.5 gram of dibasic potassium phosphate, 0.1 gram of sodium chloride, 0.02 gram of magnesium sulfate, 0.06 gram of ammonium sulfate, 0.04 grams of yeast extract, and 0.05–2.0 milligrams of thiamine. If desired, other salts may be substituted for the magnesium sulfate such as magnesium nitrate, magnesium chloride, and magnesium borate, or the chloride, nitrate, phosphate, sulfate or fluoride of calcium. The optimal concentration of each of these salts may be about 0.002–0.032% by weight of the fermentation medium. Ammonium compounds as a nitrogen source often give excellent yields of mucoid polysaccharide materials, but water soluble metal nitrates such as sodium or potassium nitrate are the preferred nitrogen source. The above fermentation medium also is very effective for the cultivation of *Pseudomonas methanica* when a normally gaseous hydrocarbon such as methane is substituted for the carbohydrate as a carbon source and a water soluble metal nitrate is used as the nitrogen source.

The microbes may be cultivated by fermentative procedures well known in the art. For instance, laboratory scale fermentations may be conducted in 500 milliliter Erlenmeyer flask and larger scale fermentations may be conducted in any suitable type or size of fermentation vessel. The fermentations are preferably conducted over a temperature range of about 15–40° C. Usually, fermentation temperatures of approximately 23 to 30° C. are preferred for most of the soil microorganisms, and temperatures of about 32 to 37° C. for microbes associated with animals and plants.

The fermentation may be conveniently conducted by adding the liquid fermentation medium or broth described above to the fermentation vessel. The vessel and fermentation medium are then sterilized and inoculated with about 0.5–15% by volume of liquid inoculum containing the desired microbe in a logarithmic stage of growth, and cultivated under the optimum temperature, pH and agitation conditions for growth and flocculant synthesis for the specific microbe. An initial pH of the fermentation medium of about 7.0 is optimum for the growth of most of the microbes, but many cultures grow rapidly over a wide pH range such as from about 4.0 to about 8.5. In some instances, it is preferred to adjust the pH before and/or during the fermentation to an optimum level for flocculant production by addition of a base such as sodium hydroxide or an acid such as hydrochloric acid.

Better results often are obtained when the fermentation medium is aerated. If desired, rotary shakers or other means for agitating and/or aerating the fermentation medium may be employed. In instances where the fermentation is highly aerobic, it is often advantageous to increase the rate of agitation and/or aeration as the fermentation proceeds and especially where the fermentation medium thickens due to the biosynthesis of mucoid polysaccharide material.

The fermentation time for polysaccharide flocculant production may vary over wide ranges such as from about 24 hours to about 14 days. A fermentation time of about 3 to 8 days is preferred for many of the microbes and in some instances about 3 to 5 days.

The fermentations for preparation of the polysaccharide flocculant may be conducted by batch, semicontinuous or continuous processes. The fermentation is especially easily adaptable to continuous operation, and rapid conversion of substrate into high yields of polysaccharide product is possible to thereby achieve good yields in short fermentation periods. If desired, the nutrients for the growth of the microbes may be added to the fermentation medium gradually, or by incremental addition.

Upon termination of the fermentation, the polysaccharide flocculant may be recovered and purified in instances where this is desirable. The purification may be carried out by diluting the fermentation broth with water, adjusting the pH to about 3.5 to 7.5, and adding methyl or ethyl alcohol in a quantity sufficient to precipitate the polysaccharide substantially quantitatively. Adjustment of the fermentative broth containing polysaccharide to a pH of about 5.5 followed by dilution with an equal volume of water and addition of about 1 to 3 volumes of alcohol have been found to be satisfactory. The precipitated polysaccharide flocculant may be separated from the fermentation medium by filtration or centrifuging and, if desired, it may be further purified by redissolving in water and repeating the precipitation and recovery steps.

In instances where the impurities are not disadvantageous, the entire fermentation broth containing the unpurified polysaccharide flocculant may be used as a flocculating agent. This procedure is usually preferred in instances where slimes in hydrometallurgical leach liquors are to be flocculated near the site of the fermentation. In such instances, unpurified fermentation broth may be added to the suspension of solids to be flocculated in its concentrated or undiluted form, or it may be diluted with water or other aqueous media and then added.

If the fermentation must be carried out at a substantial distance from the place of use of the flocculant, the polysaccharide product may be precipitated as desired above, filtered or centrifuged to remove excess water, and then dried. Drum driers, spray drying, or lyophilization may be used, but drying processes involving temperatures above about 90° C. should be avoided as high temperatures often degrade the product. The dried product may be conveniently transported to the place of use and then dissolved in water and used as a flocculant.

In flocculating finely divided solids suspended in aqueous media, a small but effective amount of either the fermentation medium containing the unpurified polysaccharide flocculant or an aqueous solution of the purified or dried polysaccharide flocculant may be added to the aqueous medium. It is usually preferred that very dilute solutions of the flocculating material be added but the concentration of the polysaccharide material is not critical and may be varied over any practical range to achieve acceptable results.

The solution of polysaccharide flocculant may be added to the suspension of solids to be flocculated following any satisfactory prior art process. In many instances, it is desirable that the polysaccharide solution be added in increments so as to achieve optimum utilization of the active components. The addition should be made in a manner so as to assure good dispersion without violent agitation since this seems to aid in the growth of the floccules and their rapid settling. Usually it is preferred that the treated aqueous media be allowed to settle and thereby cause the flocculated solids to separate at least to some extent prior to decanting of clarified liquid, or a filtration step may be introduced to remove the flocculated solids from the aqueous media.

The aqueous suspension of solids to be flocculated should have a pH value of about 2–10, and preferably about 6.5–7.5 for best results. The amount of polysaccharide flocculant to be added will depend to some extent on the concentration of suspended solids and may vary over wide ranges. It is only necessary that an amount be added sufficient to effect a desired degree of flocculation and clarification. Usually, addition of the quantity of polysaccharide contained in about 0.01–10 ml. of raw undiluted fermentation broth for each gram of suspended solids to be flocculated is sufficient.

The polysaccharide flocculants of the present invention are especially useful in flocculating finely divided solids suspended in hydrometallurgical liquors derived by treating potash ore, uranium ore and Florida phosphate ore with aqueous media. Clay slimes present in liquors derived by leaching Carlsbad potash ore with a potassium chloride-sodium chloride brine are readily flocculated by addition of an effective amount of the polysaccharide.

The polysaccharides produced in accordance with the present invention differ markedly from the dextrin and dextran produced by certain other microorganisms. The differences are especially pronounced in the degree of flocculating activity exhibited by the polysaccharide flocculant produced in accordance with the present invention and the materials employed in prior art flocculating processes. These differences seem to extend to the chemical composition of the polysaccharide per se. For instance, the dextrins and dextrans of the prior art are simply polymers of glucose, whereas the polysaccharides of the present invention consistently contain substantial amounts of other monosaccharides. Monosaccharides that have been identified as monomeric constituents in the microbial polysaccharides of the invention include glucose, and, in addition thereto, galactose and mannose along with their respective hexuronic acids, i.e., glucuronic, galacturonic and mannuronic acids. Other carbohydrate monomers which have been identified are fucose, fructose, pyruvic acid and malonic acid.

The foregoing detailed description and the following specific examples are for purposes of illustration only, and are not intended as being limiting to the spirit or scope of the appended claims.

EXAMPLE I

This example illustrates the effectiveness of the polysaccharide materials of the invention as flocculants for finely divided solids suspended in aqueous media.

A suspension was prepared containing 1% by weight of finely divided clay slimes in potash brine. The resulting suspension was equivalent to a hydrometallurgical leach liquor produced by agitation leaching Carlsbad type potash ores.

Several polysaccharide flocculants which had been synthesized by cultivating certain microorganisms listed in Table II in an aqueous fermentation medium and purified by precipitation from the fermentation broth with methanol, filtering and drying, were redissolved in water to produce a series of solutions containing 0.1% by weight of each purified polysaccharide. The 0.1% by weight solutions were diluted with 10 volumes of potash brine containing 35% by weight of soluble salts (sodium chloride and potassium chloride). Thereafter, a 10 milliliter portion of each diluted polysaccharide solution was tested by adding it to a 100 milliliter graduated cylinder containing 100 milliliters of the above prepared suspension of clay slimes in potash brine. The flocculating activity was determined by measuring the time required for the flocculated slime particles to fall 10 units (milliliter graduations) in the graduated cylinder in the initial free fall zone, i.e., before compaction occurred. A control containing no flocculant was tested to give comparative data. The data thus obtained are recorded below in Table II:

TABLE II

| Flocculant | Time required for 10 units (ml.) drop of suspended solids in free fall zone |
|---|---|
| Xanthomonas campestris B-1459 | 1'14" |
| Arthrobacter sp. B-1973 | 9'30" |
| Cryptococcus laurentii var. flavescens Y-1401 | 13'25" |
| Hansenula capsulata Y-1842 | 30'15" |
| Hansenula holstii Y-2154 | 27'20" |
| Hansenula holstii Y-2448 | 7' 1" |
| Plectania occidentalis NRRL-349 | 27" |
| Control (not treated with flocculant) | 40' 0" |

The above data indicate that it required 40 minutes for the control slime solution to fall 10 units (milliliters) in the graduated cylinder. When the slime suspension was treated with the solutions of the polysaccharide flocculants of the invention, there was a very marked reduction in the settling time in every instance. The most active fluocculants were the polysaccharides synthesized by the microbe *Xanthomonas campestris* B-1459 and *Plectania occidentalis*, which reduced the settling time to only 1 minute 14 seconds and 27 seconds, respectively.

EXAMPLE II

The fermentation used in this example contained the following ingredients: 100 milliliters of water, 5 grams of sucrose, 0.5 gram of dibasic potassium phosphate, 0.1 gram of sodium chloride, 0.02 gram of magnesium sulfate, 0.06 gram of ammonium sulfate, 0.04 gram of dried yeast extract and 1.0 milligram of thiamine. The initial pH of the fermentation medium was 5.2. The fermentation medium was sterilized and added to a 500 milliliter Erlenmeyer flask. The flask was then inoculated with a culture of *Pullularia pullulans* and incubated on a rotary shaker at a temperature of 28° C. for 3 days. The fermentation broth contained a mucoid polysaccharide material at the end of the fermentation period.

The above prepared fermentation broth was tested for activity as a flocculant for uranium ore slimes and phosphate ore slimes. In conducting the tests, the undiluted and unpurified fermentation broth in the amounts set out in Table III was tested on a 2% uranium ore slime and also on a 1.02% phosphate ore slime. The time required for the slimes to settle to 50% of the volume occupied by the liquor was observed and recorded. The following data were obtained:

TABLE III

| Type clay slime | Pullularia pullulans Flocculant, ml. broth/100 ml. slime | Time required for 50% sedimentation |
|---|---|---|
| Uranium ore slime containing 2.0% clay in raffinate liquor. | 0.00 | 6'30" |
|  | 0.01 | 4'20" |
|  | 0.05 | 1'45" |
| Phosphate ore slime containing 1.02% clay in aqueous liquor. | 0.00 | 65'30" |
|  | 0.04 | 39'30" |
|  | 0.06 | 29'40" |

The above data show that addition of only 0.05 milliliter of the undiluted fermentation broth to 100 milliliters of liquor decreased the time for 50% sedimentation for uranium ore slimes from 6'30" to 1'45". Phosphate ore slimes are more difficult to flocculate, but even so, only 0.06 milliliter of the fermentation broth for each 100 milliliters of liquor decreased the 50% sedimentation time from 65'30" to 29'40".

What is claimed is:

1. A process for flocculating finely divided inorganic solids suspended in an aqueous medium comprising admixing in the said aqueous medium an effective amount of a flocculating agent to flocculate the suspended inorganic solids, the flocculating agent including a polysaccharide flocculant material prepared by cultivating at least one microorganism selected from the group consisting of *Pullularia pullulans*, xanthomonas campestris B-1459, Arthrobacter sp. B-1973, *Cryptococcus laurentii* var. *flavescens* Y-1401, *Hansenula capsulata* Y-1842, *Hansenula holstii* Y-2154, *Hansenula holstii* Y-2448 and *Plectania occidentalis* NRRL-349 in an aqueous fermentation medium therefor, the microorganism being capable of synthesizing polysaccharide material having activity as a flocculant for the suspended solids when cultivated in the said fermentation medium and being cultivated therein until the polysaccharide flocculant material is produced, and settling the flocculated inorganic solids.

2. The process of claim 1 wherein the aqueous medium containing the finely divided solids to be flocculated has a pH value of about 2-10.

3. The process of claim 1 wherein the aqueous medium containing the finely divided solids to be flocculated is selected from the group consisting of potash ore leach liquors, uranium ore leach liquors and phosphate ore leach liquors.

4. The process of claim 3 wherein the leach liquor has a pH value of about 2-10.

5. The process of claim 1 wherein the microorganism *Pullularia pullulans* is cultivated in the fermentation medium to produce the polysaccharide flocculant material.

6. The process of claim 1 wherein the microorganism Arthrobacter sp. B-1973 is cultivated in the fermentation medium to produce the polysaccharide flocculant material.

7. The process of claim 1 wherein the microorganism *Xanthomonas campestris* is cultivated in the fermentation medium to produce the polysaccharide flocculant material.

8. The process of claim 1 wherein the microorganism *Plectania occidentalis* is cultivated in the fermentation medium to produce the polysaccharide flocculant material.

9. The process of claim 1 wherein the microorganism *Hansenula holstii* Y-2448 is cultivated in the fermentation medium to produce the polysaccharide flocculant material.

10. A process for flocculating finely divided solids suspended in a leach liquor derived by leaching potash ore with an aqueous medium comprising admixing in the said leach liquor an effective amount of a flocculating agent to flocculate the suspended solids, the leach liquor having a pH value of about 2-10 and the flocculating agent including a polysaccharide flocculant material prepared by cultivating at least one microorganism selected from the group *Pullularia pullulans*, *Xanthomonas campestris* B-1459, Arthrobacter sp. B-1973, *Cryptococcus laurentii* var. *flavescens* Y-1401, *Hansenula capsulata* Y-1842, *Hansenula holstii* Y-2154, *Hansenula holstii* Y-2448 and *Plectania occidentalis* NRRL-349 in an aqueous fermentation medium therefor, the microorganism being capable of synthesizing polysaccharide material having activity as a flocculant for the suspended solids when cultivated in the said fermentation medium and being cultivated therein until the polysaccharide flocculant material is produced.

11. The process of claim 10 wherein the microorganism *Pullularia pullulans* is cultivated in the fermentation medium to produce the polysaccharide flocculant material.

12. The process of claim 10 wherein the microorganism Arthrobacter sp. B-1973 is cultivated in the fermentation medium to produce the polysaccharide flocculant material.

13. The process of claim 10 wherein the microorganism *Xanthomonas campestris* is cultivated in the fermentation medium to produce the polysaccharide flocculant material.

14. The process of claim 10 wherein the microorganism *Plectania occidentalis* is cultivated in the fermentation medium to produce the polysaccharide flocculant material.

15. The process of claim 10 wherein the microorganism *Hansenula holstii* Y–2448 is cultivated in the fermentation medium to produce the polysaccharide flocculant material.

References Cited

UNITED STATES PATENTS

| | | | |
|---|---|---|---|
| 303,930 | 8/1884 | Grimm | 127—65 |
| 2,689,816 | 9/1954 | Kooi | 195—31 |
| 2,937,143 | 5/1960 | Goren | 210—54 X |
| 2,961,378 | 11/1960 | Benedict et al. | 195—31 |
| 3,085,853 | 4/1963 | Lesinski et al. | 210—54 X |
| 3,096,293 | 7/1963 | Jeanes et al. | 195—31 X |

FOREIGN PATENTS

| | | |
|---|---|---|
| 200,883 | 2/1956 | Australia. |
| 1,096,850 | 1/1961 | Germany. |

OTHER REFERENCES

Jeanes, A., et al., Characterization and Classification of Dextrans From Ninety-six Strains of Bacteria, J. of the American Chem. Soc., vol. 76, 1954, pp. 5041–5052.

Cadmus, M. C., et al., Production of a New Polysaccharide etc., Applied Microbiology, March 1962, vol. 10, pp. 153–156.

MICHAEL E. ROGERS, *Primary Examiner.*